(12) United States Patent
Zemel et al.

(10) Patent No.: US 7,669,523 B1
(45) Date of Patent: Mar. 2, 2010

(54) MULTIPLE UPSTANDING SUPPORT FOOD COOKING RACK

(75) Inventors: Marc Zemel, Melville, NY (US); Wayne B. Margolin, Kowloon (CN)

(73) Assignee: Mr. Bar-B-Q-, Inc., Old Bethpage, NY (US)

( * ) Notice: Subject to any disclaimer, the term of this patent is extended or adjusted under 35 U.S.C. 154(b) by 1226 days.

(21) Appl. No.: 11/094,705

(22) Filed: Mar. 30, 2005

(51) Int. Cl.
  *A22C 7/00* (2006.01)
  *A47J 37/10* (2006.01)

(52) U.S. Cl. .......................................... 99/426; 99/425

(58) Field of Classification Search .................. 99/410, 99/413–416, 418–419, 421 A, 425–428, 444; 211/36; 220/487–488
See application file for complete search history.

(56) References Cited

U.S. PATENT DOCUMENTS

| | | | |
|---|---|---|---|
| 2,144,278 A | 1/1939 | Wallace | |
| 2,616,360 A | 11/1952 | Thompson | |
| 3,585,922 A | 6/1971 | Peterson | |
| 3,858,495 A * | 1/1975 | Gotwalt | .................. 99/421 HH |
| 3,915,309 A | 10/1975 | Brazdo | |
| 4,458,585 A | 7/1984 | Erbach | |
| 4,559,869 A | 12/1985 | Hogan | |
| 4,942,862 A | 7/1990 | Alden et al. | |
| 5,158,009 A | 10/1992 | Stewart | |
| 5,562,023 A | 10/1996 | Harrison | |
| 5,791,018 A * | 8/1998 | Yoshinobu | .................... 16/374 |
| D416,165 S | 11/1999 | Zemel | |
| 6,116,153 A | 9/2000 | Borrows | |
| 6,164,194 A * | 12/2000 | Westmoreland | ............... 99/426 |
| 6,386,096 B1 * | 5/2002 | Tiemann | ....................... 99/426 |
| 6,474,224 B1 | 11/2002 | Natter | |
| 7,281,469 B1 * | 10/2007 | Barbour et al. | ............... 99/426 |

FOREIGN PATENT DOCUMENTS

GB  2232867 A  1/1991

OTHER PUBLICATIONS

Charcoal Companion Space Saver Rib Rack Box Product #SS-RR © 2000 The Companion Group.

* cited by examiner

*Primary Examiner*—Tu B Hoang
*Assistant Examiner*—Lindsey C Teaters
(74) *Attorney, Agent, or Firm*—Seth Natter; Natter & Natter

(57) ABSTRACT

A rack for positioning food slabs in a horizontal cooking area such as over a grill includes a rectangular frame which carries a plurality of bent rod food slab supports at a rearward tilt. Each support includes a pair of outer risers having interned lower ends. The outer risers extend over opposite sides of the frame, with the interned ends extending through apertures in the frame sides. Between the outer risers, the rod is bent in a digital waveform and includes forwardly extending lower cradle having upwardly sloped shoulders for engaging the bottom of a food slab. Notches are provided in the upper edge of the frame sides forwardly of each aperture and a notch engaging post extends from the cradle shoulders which are adjacent each outer riser. The ends of the frame are lapped and hinged, so that the frame may be folded along a longitudinal axis for compact storage, with the slab supports nested within the folded frame.

12 Claims, 3 Drawing Sheets

MULTIPLE UPSTANDING SUPPORT FOOD COOKING RACK

BACKGROUND OF THE INVENTION

1. Field of the Invention

The present invention relates generally to cooking accessories and more specifically to a rack for efficiently positioning a plurality of food slabs.

2. Antecedents of the Invention

Various cooking accessories have been employed for positioning uncooked food items over a grill or other cooking surface. Typical examples include the rack system disclosed in U.S. Pat. No. 6,474,224, assigned to the assignee of the instant invention and the cooking basket disclosed in U.S. Pat. Des. 416,165, also assigned to the assignee of the present invention. It has also been proposed to lay ears of corn horizontally across a plurality of cradles formed in spaced wire supports for cooking on an outdoor barbecue grill, as shown in U.S. Pat. No. 4,942,862.

Cooking accessories have also been proposed for vertically supporting poultry as shown in U.S. Pat. No. 6,062,131, as well as corn, as shown in U.S. Pat. No. 4,458,585.

Because of geometric limitations on the quantity of foods which could be simultaneously cooked in a horizontal position, the employment of racks has been suggested for holding a plurality of uncooked food slabs in an upright position, as exemplified by U.S. Pat. No. 5,562,023 and U.S. Pat. No. 6,116,153. Certain disadvantages accompanied these prior rack systems, however. For example, the rack system of U.S. Pat. No. 6,116,153 comprised a unitary welded structure which occupied significant storage space and posed problems with respect to cleaning after usage.

The rack system disclosed in U.S. Pat. No. 5,562,023 posed similar problems with respect to its unitary structure which hindered cleaning. Further, a significant disadvantage of this rack system included the fact that slabs of uncooked food having a length less than the span between longitudinal side bars would fall through the rack.

SUMMARY OF THE INVENTION

A grilling rack for holding several slabs of food in a cooking environment, such as on a grill or in an oven, includes a rectangular frame and a plurality of bent rod food slab supports. Each support includes parallel outer risers overlying opposite sides of the frame. An interned end of each outer riser extends through an associated aperture in each side of the frame.

Between the outer risers, the slab support rod is bent into a continuous digital waveform having parallel inner risers. Each riser is joined at its top and bottom to an adjacent riser, with each riser being joined to the next adjacent riser at the top on one side and at the bottom, on the other side.

The rod is bent into horizontal stay sections joining the tops of risers and into cradle sections, joining the bottoms of risers. Each cradle section is formed with a pair of forwardly extending tines having upwardly sloped shoulders for engaging the bottom of a food slab. Adjacent shoulders are joined by stay sections.

Horizontal posts extend from the shoulders adjacent each outer riser toward the sides of the frames. The posts engage notches in the upper edges of the frame sides to fix the supports at a slight rearward tilt.

The frame is formed by two sections which are pivoted about a longitudinal axis. Each section comprises a longitudinal side and a pair of parallel end spans. Portions of the end spans of one section are lapped over portions of the end spans of the other section. Coaxial hinge pins join the lapped portions.

From the foregoing compendium, it will be appreciated that it is an aspect of the present invention to provide a rack of the general character described for positioning food slabs which is not subject to the disadvantages of the aforementioned antecedents of the invention.

It is a feature of the present invention to provide a rack of the general character described for positioning food slabs which is simple to use.

A consideration of the present invention is to provide a rack of the general character described for positioning food slabs which is relatively low in cost.

A further aspect of the present invention is to provide a rack of the general character described for positioning food slabs which is easy to clean and maintain.

Another feature of the present invention is to provide a rack of the general character described for positioning food slabs which is simple to assemble and disassemble.

Another consideration of the present invention is to provide a rack of the general character described for positioning food slabs which is well suited for economic or mass production fabrication.

A still further aspect of the present invention is to provide a rack of the general character described for positioning food slabs which can accommodate food slabs of varying lengths.

Yet another consideration of the present invention is to provide a rack of the general character described for positioning food slabs which includes bent rod slab supports having food slab rests for engaging a lower edge of a food slab.

Yet another feature of the present invention is to provide a rack of the general character described for positioning food slabs which may be disassembled for compact storage when not in use.

A still further aspect of the present invention is to provide a rack of the general character described for positioning food slabs wherein removable food slab supports are fixed in position relative to a support frame.

A further consideration of the present invention is to provide a rack of the general character described for positioning food slabs which can accommodate food slabs which are relatively small.

Other aspects, features and considerations of the present invention in part will be obvious and in part will be pointed out hereinafter.

With these ends in view, the invention finds embodiment in the various combinations of elements, arrangements of parts and series of steps by which the aforesaid aspects, features and considerations and certain other aspects, features and considerations are attained, all with reference to the following description and the accompanying drawings and the scope of which will be more particularly pointed out and indicated in the appended claims.

BRIEF DESCRIPTION OF THE DRAWINGS

In the accompanying drawings, in which is shown one of the various exemplary embodiments of the invention.

DESCRIPTION OF THE PREFERRED EMBODIMENT

Figure 1:
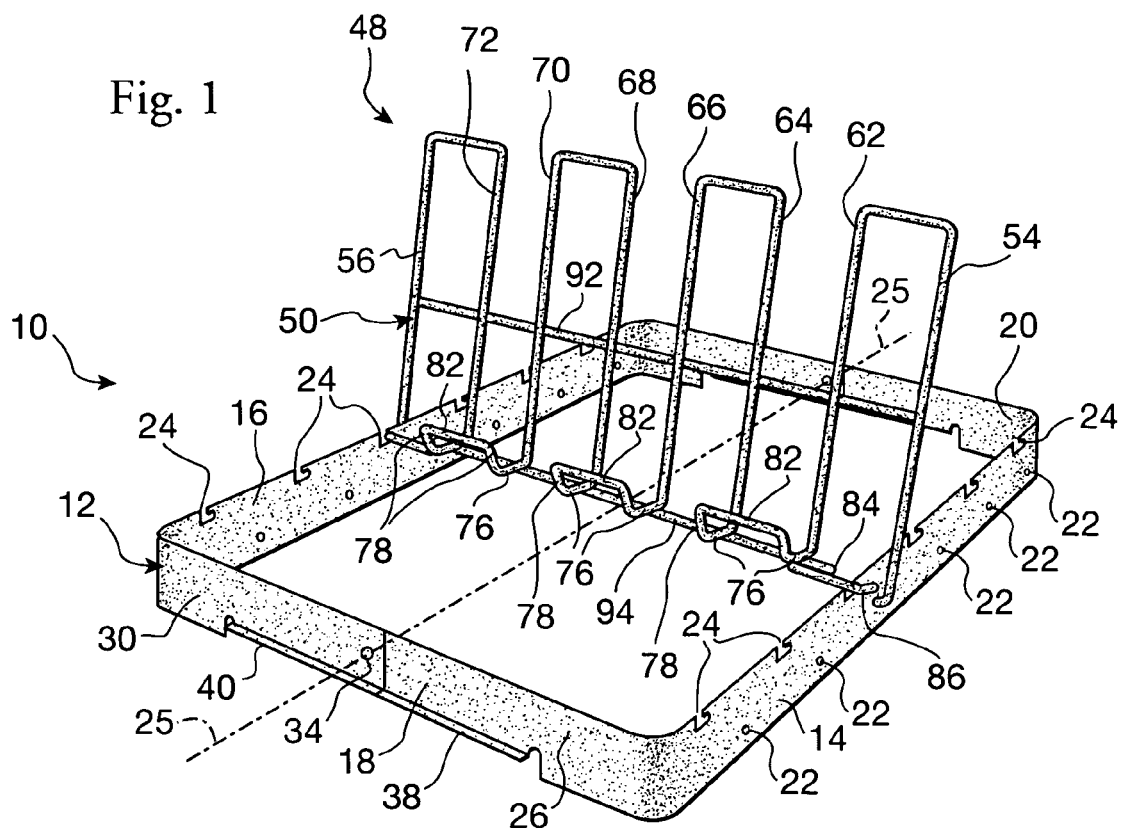
FIG. 1 is a perspective view of a cooking rack constructed in accordance with and embodying the invention and showing a frame and a food slab support, with remaining food slab supports having been omitted for clarity.

Referring now in detail to the drawings, the reference numeral 10 denotes generally a cooking rack constructed in accordance with and embodying the invention. The cooking rack 10 comprises a substantially rectangular frame 12 which may be formed of heat resistant coated sheet metal. The frame is oriented in a horizontal plane on a cooking surface, such as a grill of an outdoor barbecue or within a different cooking environment, such as in an oven.

The frame 12 includes a pair of parallel longitudinal side panels 14, 16, a front panel 18 and a rear panel 20. The side panels 14, 16, are provided with a plurality of evenly spaced apertures 22. A like plurality of notches 24 are formed in the upper perimetrical edge of each side panel 14, 16 forwardly of each aperture 22. Each aperture 22 and the closest notch 24 positioned forwardly of the aperture comprise an adjacent pair.

The frame 12 is constructed of two sections which are pivoted about a longitudinal axis 25. A first section comprises the side panel 14 as well as a pair of parallel end spans, a front end span 26 and a rear end span 28. A second section is formed of the longitudinal side panel 16 together with a front end span 30 and a rear end span 32.

Figure 2:
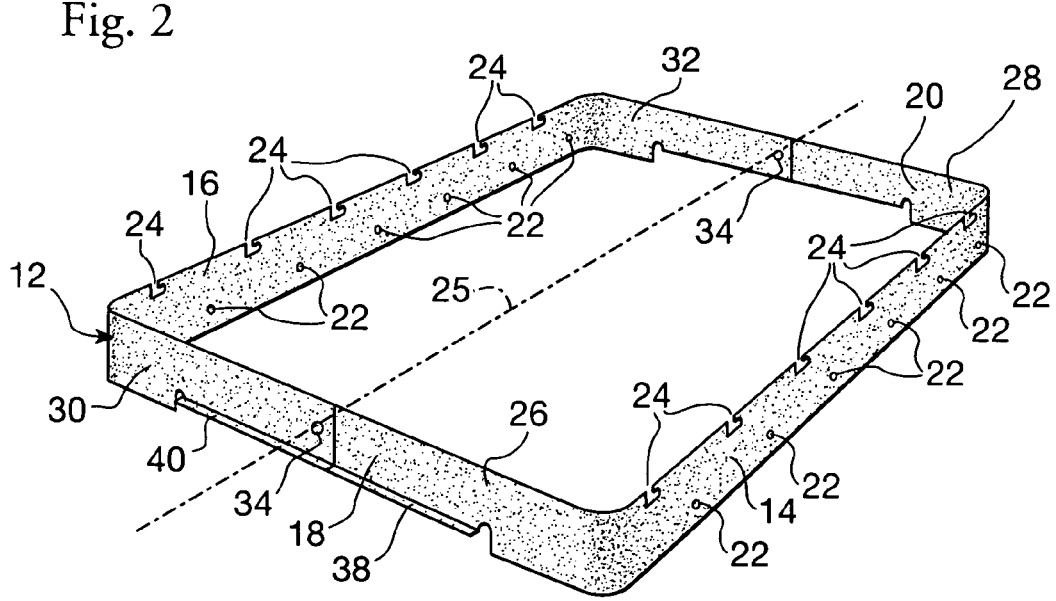
FIG. 2 is a perspective illustration of the frame, without food slab supports and prior to assembly of the cooking rack.

Accordingly, the front panel 18 is formed of the front end spans 26, 30 and the rear panel 20 is formed of the rear end spans 28, 32. It should be noted that portions of the front end spans 26, 30 overlap one another and portions of the rear end spans 28, 32 overlap one another. Registered apertures are provided through the overlapped portions of the end spans and rivet hinge pins 34 extend through the registered apertures. As such, the sections of the frame may be pivoted about the axis 25 from a closed storage position, illustrated in FIG. 7, to an open position, illustrated in FIG. 2 for assembly of the cooking rack 10.

It should also be noted that outwardly bent flanges 38, 40, 42 and 44 are formed between notched portions in bottom edges of the end spans 26, 28, 30, 32. The flanges 38, 40, 42 and 44 serve as grasping areas for rotation of the frame sections as well as abutment stops to limit rotation of the sections in the opened and closed positions.

In accordance with the invention, a plurality of food slab supports 48 are mounted to the frame 12 to form the cooking rack 10 and position a plurality of slabs of food during cooking. The slab supports 48 are identical to one another, with each slab support 48 being mounted to the frame 12 at an associated aperture 22 and notch 24 in the respective side panels.

Figure 3:
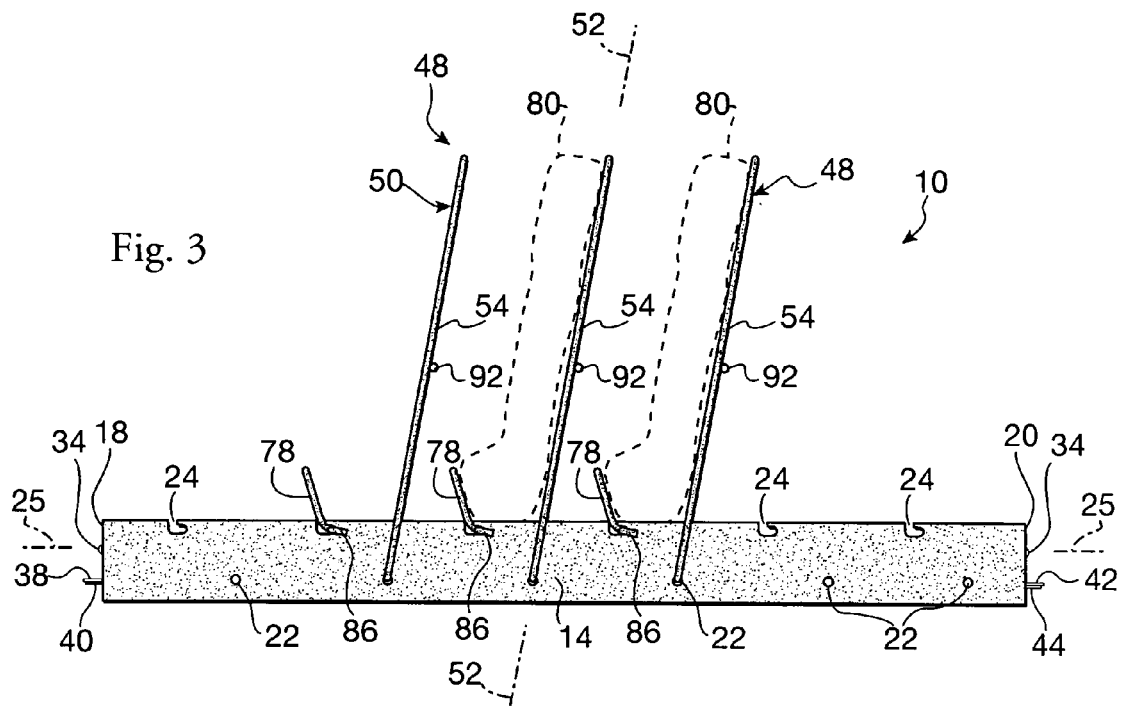
FIG. 3 is a side elevational view of the cooking rack, with some food slab supports omitted for clarity.
Figures 4, 5:
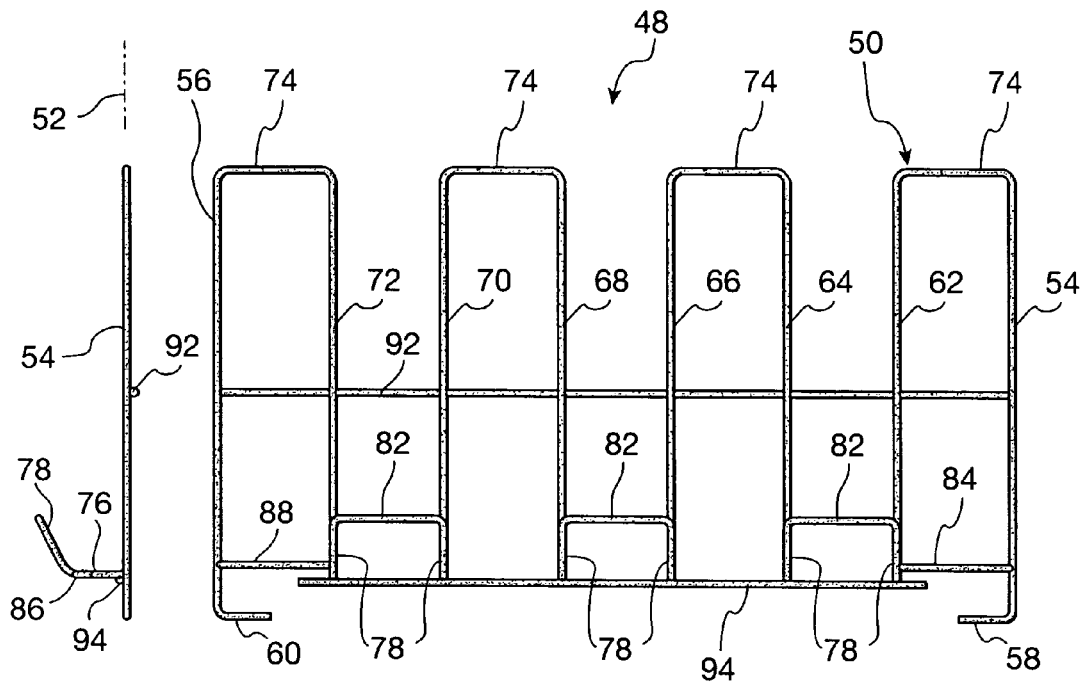
FIG. 4 is a front elevational view of a food slab support showing a bent rod configured in a digital waveform.
FIG. 5 is a side elevational view of the food slab support and illustrating a forwardly extending tine with upwardly sloped shoulder.
Figure 6:
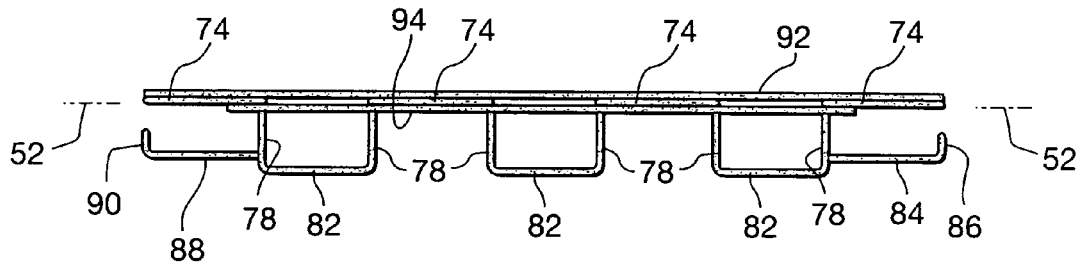
FIG. 6 is a top plan view of the food slab support, illustrating a pair of horizontal posts configured to engage slots formed in side panels of the frame.

Each slab support 48 comprises a skeletal frame formed primarily of a single bent rod 50 and lying substantially in a single plane, e.g. a plane 52, illustrated in FIG. 3, FIG. 5 and FIG. 6.

As can be seen from an observation of FIG. 1 and FIG. 4, the rod 50 comprises a continuous single length which is bent in the overall configuration of a digital waveform. As with the frame 12, the slab-support is preferably formed of heat resistant coated metal.

The skeletal frame includes a pair of parallel outer risers 54, 56 which overlie the side panels 14, 16 and include interned lower ends 58, 60 which are inserted through a registered pair of apertures 22 in the side panels 14, 16.

Between the outer risers 54, 56, the rod 50 is bent into a plurality of parallel equidistantly spaced internal risers, 62, 64, 66, 68, 70 and 72, with the upper ends of the risers 54 and 62, 64 and 66, 68 and 70 and 72 and 56 joined by horizontal stays 74.

At the lower end of the inner risers 62, 64, 66, 68, 70 and 72, the rod 50 is bent into perpendicular forwardly projecting tines 76 having upwardly projecting shoulders 78. The shoulders 78 associated with the risers 62 and 66, 66 and 68 and 70 and 72 are joined together by lower horizontal stays 82 to form a plurality of cradles as best illustrated in FIG. 1.

Typical food slabs 80 are illustrated in dashed lines in FIG. 3. Since the bottom of each food slab 80 rests on the tines 76 and shoulders 78, which function as a food slab rest, the length of the food slab 80 may certainly be less than the span between the longitudinal side panels 14, 16, without the slab falling onto the cooking heat source.

From an examination of FIG. 1 and FIG. 6, it will be seen that a notch engaging horizontal post 84 extends from the shoulder 78, associated with the riser 62, toward the outer riser 54. The post 84 includes an interned end portion 86 which extends toward the plane 52. Similarly, a notch engaging horizontal post 88 extends from the shoulder 78, associated with the riser 72, toward the riser 56, with the post 88 having an interned end portion 90.

The horizontal posts 84, 88 are engaged through registered side panel notches 24 associated with the apertures 22 engaged by the food slab support 48. The end portions 86, 90 overly the outer faces of the respective side panels.

Each slab support 48 is mounted on the frame 12 at a slightly rearwardly sloped angle of approximately 10°, as illustrated in FIG. 3 and which slope is fixed by engagement between the posts 84, 88 and the notches 24.

Slab support reinforcement is furnished by a midheight horizontal stringer 92 fixed, as by welding, to the rear surfaces of the risers. A lower horizontal stringer 94 joins the risers to one another at the juncture between each riser and its associated tine 76.

With six sets of apertures 22 and stays 24 in each side panel 14, 16, a cooking rack 10 having six slab supports 48 is provided for simultaneously cooking six slabs 80 of food. The number of slab supports 48 accommodated in the cooking rack 10 can easily be varied by changing the length of the side panels and the number of apertures 22 and associated notches 24.

After slabs of food have been cooked, the cooking rack 10 may be easily disassembled for hand or dishwasher cleaning. To disassemble the cooking rack 10, the side panels 14, 16 are urged toward one another to disengage the interned ends 58, 60 of the outer risers from the apertures 22 and the each slab support 48 is rotated toward the front panel 18, to disengage the horizontal posts 84, 88 from the notches 24.

Figure 7:
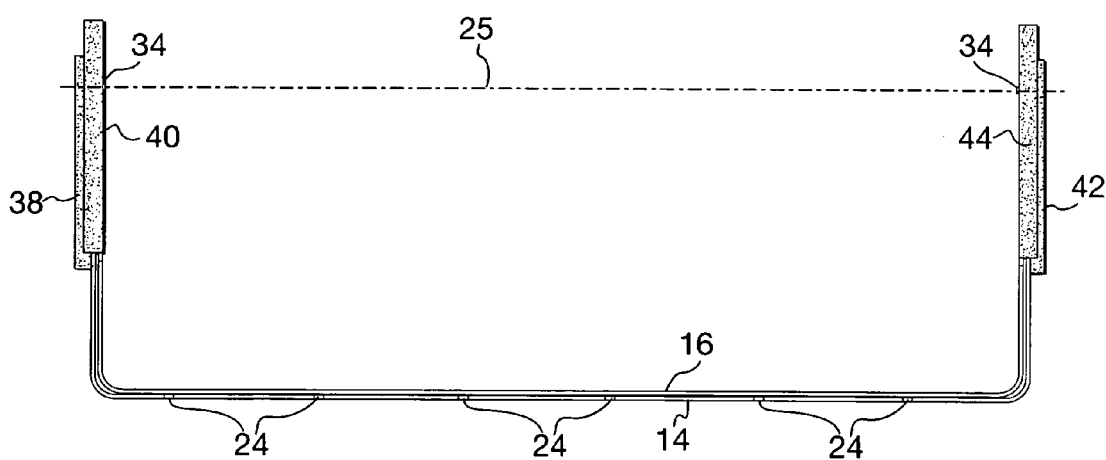
FIG. 7 is a top plan view of the frame in a folded storage position.

It is also significant that with the frame 12 folded to its FIG. 7 position, the slab supports 48 may be nested within an area defined by the end spans and the side panels for compact storage, either within a storage box or container, on a shelf, or in a bin or other storage area.

Thus is will be seen that there is provided a cooking rack which achieves the various aspects, features, and considerations of the present invention and which is well suited to meet the conditions of practical usage.

Since various possible embodiments might be made of the present invention and since various changes might be made in the exemplary embodiment set forth herein without departing from the spirit of the invention, it is to be understood that all matter herein described or shown in the accompanying drawings it to be interpreted as illustrative and not in a limiting sense and that the following claims are to be interpreted in light of the foregoing.

Having thus described the invention, there is claimed as new and desired to be secured by Letters Patent:

1. A cooking rack for simultaneously cooking more than one food slab, the cooking rack comprising a generally rectangular frame, the frame including pair of parallel side panels, a front panel and a rear panel, a plurality of equidistantly spaced apertures in each side panel and a like plurality of equidistantly spaced notches formed in the upper perimetrical edge of each side panel, each notch being associated with one of said apertures to form an adjacent pair, each notch of each adjacent pair being positioned forwardly of its associated aperture, the cooking rack further including more than one food slab support each food slab support lying substantially in a plane, each food slab support being formed of rod, the plane being inclined rearwardly relative to the frame, each food slab support including a pair of parallel side panel engaging risers, each side panel engaging riser having an end portion engaged in a selected aperture in each side panel, the selected apertures being registered with one another, each food slab support including at least one food slab rest extending forwardly of the plane, each food slab support including a pair of horizontal posts, each post being fixed relative to and positioned forwardly of the plane, each post engaging a notch of an adjacent pair forwardly of the plane of the slab support for maintaining the slab support in its rearwardly inclined position relative to the frame.

2. A cooking rack for simultaneously cooking more than one food slab as constructed in accordance with claim 1 wherein each food slab support includes a plurality of food slab rests.

3. A cooking rack for simultaneously cooking more than one food slab as constructed in accordance with claim 1 wherein each food slab support includes a plurality of internal risers positioned between and parallel to the side panel engaging risers, the internal risers and the side panel engaging risers being formed of a single bent rod.

4. A cooking rack for simultaneously cooking more than one food slab as constructed in accordance with claim 3 wherein the bent rod is configured in a digital waveform.

5. A cooking rack for simultaneously cooking more than one food slab as constructed in accordance with claim 3 wherein the food slab rest extends from at least one of the internal risers.

6. A cooking rack for simultaneously cooking more than one food slab as constructed in accordance with claim 1 wherein the food slab rest comprises tines extending perpendicular to and forwardly from the plane, the tines having upwardly sloped shoulders, the side panel engaging risers, the internal risers and the tines being formed of a single bent rod.

7. A cooking rack for simultaneously cooking more than one food slab as constructed in accordance with claim 6 further including a stay, the stay spanning between adjacent sloped shoulders, the side panel engaging risers, the internal risers, the tines and the stay being formed of a single bent rod.

8. A cooking rack for simultaneously cooking more than one food slab as constructed in accordance with claim 7 wherein the horizontal posts are fixed to the tines adjacent each side panel engaging riser.

9. A cooking rack for simultaneously cooking more than one food slab as constructed in accordance with claim 1, the front panel and the rear panel each comprising two spans, the front panel and the rear panel being parallel to one another, the frame comprising two sections, each section including a side panel, a span of the front panel and a span of the rear panel, the sections being registered with one another with portions of the front panel spans and portions of the rear panel spans overlapping one another, a hinge pin extending through the overlapped portions of the front panel spans and a hinge pin extending through the overlapped portions of the rear panel spans, the hinge pins being coaxial, whereby the sections of the frame may be rotated about the hinge pins to a storage position, the slab supports being dimensioned to be nested between the front panel spans and the rear panel spans with the frame in the storage position.

10. A cooking rack for simultaneously cooking more than one food slab as constructed in accordance with claim 9 further including a heat resistant coating on the frame.

11. A cooking rack for simultaneously cooking more than one food slab as constructed in accordance with claim 9 wherein each food slab support includes a plurality of food slab rests.

12. A cooking rack for simultaneously cooking more than one food slab as constructed in accordance with claim 9 wherein each food slab support includes a plurality of risers positioned between and parallel to the risers having end portions engaged in the side panel apertures.

\* \* \* \* \*